United States Patent
Alain et al.

[15] 3,663,141
[45] May 16, 1972

[54] APPARATUS FOR MAKING A MOLDED PROSTHESIS

[72] Inventors: Alain Clenet, Metamora; Rudiger Piatkowski, Birmingham, both of Mich.

[73] Assignee: said Piatkowski, by said Clenet

[22] Filed: Feb. 26, 1970

[21] Appl. No.: 14,580

[52] U.S. Cl. .................................. 425/175, 164/34, 249/54, 264/17, 425/242, 425/195, 425/98
[51] Int. Cl. ........................................................ A61c 13/04
[58] Field of Search .................. 18/32, 33, 34.1, 47 D, 5.7; 164/34, 339, 341; 264/16, 17, 18, 19; 32/2, 4, 5, 6, 14; 249/54, 55

[56] References Cited

UNITED STATES PATENTS

| | | | |
|---|---|---|---|
| 2,359,152 | 9/1944 | Pryor et al. | 264/17 UX |
| 1,150,102 | 8/1915 | Cruickshank | 164/34 |
| 2,091,885 | 8/1937 | Saidel | 264/17 |

Primary Examiner—J. Spencer Overholser
Assistant Examiner—Norman E. Lehrer
Attorney—Hauke, Gifford and Patalidis

[57] ABSTRACT

A method and apparatus for making a molded prosthesis such as a denture, a partial, an orthondic appliance, or the like by way of a mold flask permitting the prosthesis to be obtained by means of injection molding. A first half mold is made of a cast of the buccal tissue portion bearing the prosthesis, a wax pattern of the prosthesis is disposed in adhesion to the appropriate portion of the cast and the cast is placed in a flask where it is held in position by appropriate holding means. Investment material is poured between the tissue cast and the side of the flask, and once set forms the second half of the mold. The two halves of the mold are removed from the flask and the wax pattern is removed. The two halves of the mold are returned to the flask and held in appropriate registration, and an appropriate hardenable fluid material is injected into a gate into the cavity resulting from the removal of the prosthesis pattern and the material allowed to set to a solid form, thus providing the molded prosthesis. The molded prosthesis requires very little, if any, finishing work for providing an accurately fitted denture, partial, orthondic appliance, or other prosthetic part.

5 Claims, 5 Drawing Figures

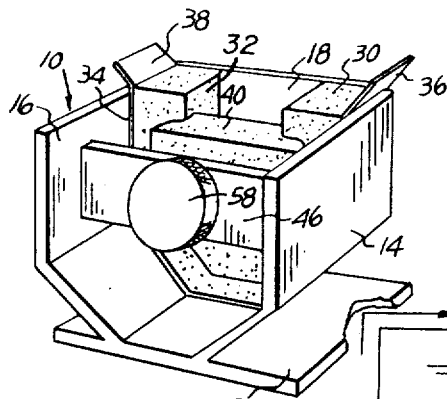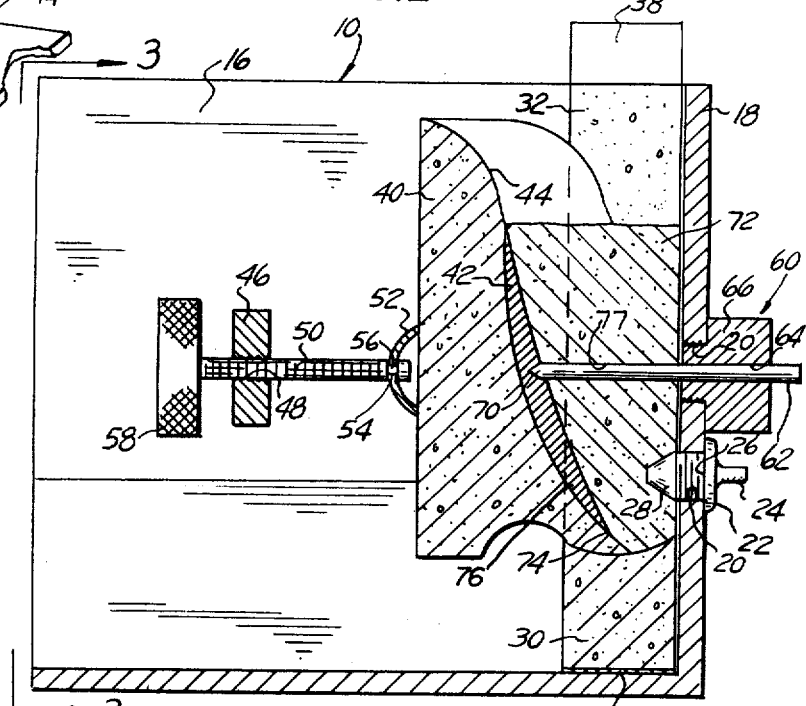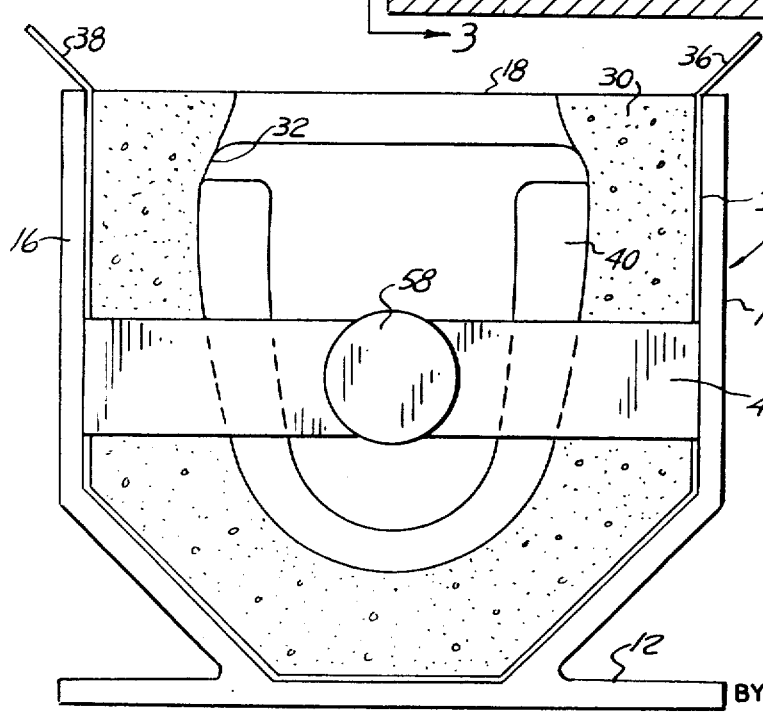

INVENTORS
ALAIN CLENET
RUDIGER PIATKOWSKI

BY Hauke, Gifford & Patalidis
ATTORNEYS

APPARATUS FOR MAKING A MOLDED PROSTHESIS

BACKGROUND OF THE INVENTION

1. Field of the Invention

The present invention relates generally to a method and means for making molded prosthesis articles, made preferably of plastic and the like, and particularly dentures, partials, orthondic appliances and the like. More particularly, the invention relates to a process and apparatus whereby a prosthesis article is formed to the desired shape in a fixed mold cavity formed by two half molds placed in position in an appropriate flask and provided with a gate leading into the mold cavity from the exterior of the flask. The prosthesis article is thus obtained by precision casting of an appropriate hardenable material, such as for example, a hardenable polymerizable resin mixture, although it will be appreciated that the principles of the present invention are also applicable to making other articles than dentures, partials or orthondic appliances, and to materials other than hardenable resin material, such as metals, porcelains, and the like.

2. Description of the Prior Art

In the present practice for molding prosthesis appliances such as dentures, partials, orthondic articles, and the like, which in use require accurate adaptation to the tissue bearing surface on which the prosthesis fits and by which it is supported, an imprint of an appropriate portion of the buccal cavity is made by a dentist, and such imprint is used for casting a plaster or stone model of the tissue bearing surfaces. When it is desired to make a denture, partial, orthondic article or the like, a wax pattern of the denture, partial or orthondic article is made and a second half mold is produced by investment casting of plaster, such as plaster of paris, or "stone." The wax pattern is then removed and the two half molds are disposed in a fixture which, for all practical purpose, operates substantially as a press. The two half molds are subsequently forcibly pressed against each other, the surplus material exuding and flowing between the two molds until predetermined abutting surfaces of the half molds engage one another. The two half molds are then placed in an appropriate flask in which the material may be subjected to a subsequent operation such as cold curing or heat curing, for example when the material used is a cold or heat polymerizable resin material. Such process requires a considerable amount of finishing work by skilled technicians for trimming, grinding, and polishing the prosthesis, and precautions must be taken to ensure proper alignment and registration of the two half molds during pressing.

Prosthesis may be made, according to the present practice, by methods and apparatus similar to those used for making dentures, partials and the like. However, a more common practice consists in forming the prosthesis part directly on the cast plaster or stone model of the tissue bearing surfaces by successive coatings or layers of an appropriate hardenable material. Conventionally, an acrylic resin cold cure material is generally used, which requires consecutive applications of powder resin each followed by wetting with a liquid polymerizing agent. The resulting orthondic appliance is generally of an excessive thickness and is substantially oversize, with a very poor surface finish, and thus requires a considerable amount of additional work for trimming, grinding, polishing and finishing, which requires considerable skill on the part of the operator.

Briefly stated, therefore, the methods of the prior art are time consuming and costly, require great skill and experience on the part of the technician, and often result in obtaining ill-fitting prosthesis.

SUMMARY OF THE INVENTION

The present invention permits to obtain prosthesis articles in a substantially short time by means of semi-skilled or unskilled labor, with greater accuracy and precision, and consequently better fit, than usually obtainable by conventional means. The present invention, furthermore, by requiring only a minimum of operations to be effected for obtaining a perfectly fitting prosthesis article, with complete elimination of scrap, leads itself naturally to mass production and considerable reduction of cost. By utilizing a fixed mold cavity formed in two stationary firmly engaged half molds inaccuracy and reject due to unperfect alignment of movable half molds squeezing from their interface a pasty material is obviously avoided. By utilizing precision injection molding, the present invention reduces to a minimum, if any, the finishing operations and the skill required in effecting such finishing operations.

BRIEF DESCRIPTION OF THE DRAWINGS

The many objects and advantages of the present invention will become apparent to those skilled in the art when the following description of some of the best modes contemplated for practicing the invention is read in conjunction with the accompanying drawing wherein:

FIG. 1 is a perspective view of a flask according to the present invention;

FIG. 2 is a longitudinal sectional view of the flask of FIG. 1 with two half molds held in position in the flask, after casting of the second half mold and prior to opening of the flask for removing the mold cavity forming wax pattern;

FIG. 3 is an end view of the flask from line 3—3 of FIG. 2;

DETAILED DESCRIPTION OF THE PREFERRED EMBODIMENT

Figure 4:
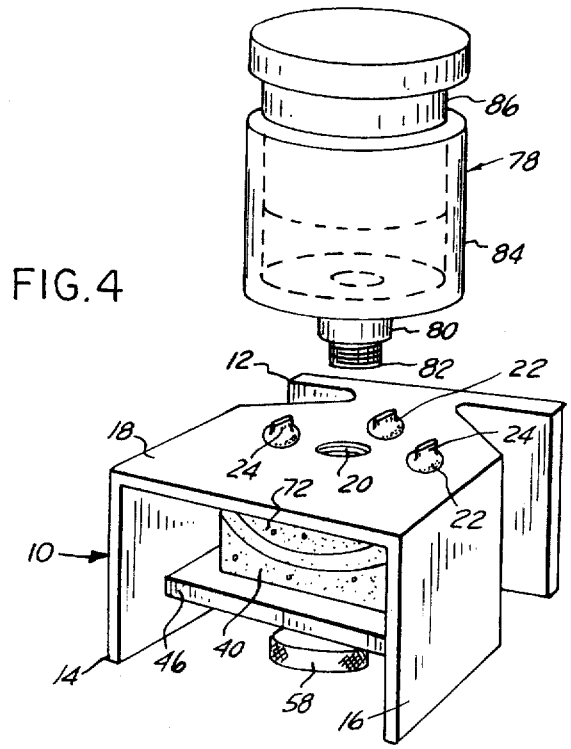
FIG. 4 is a perspective view of the flask, showing the closed end thereof provided with an injection aperture and prior to connecting thereto of the injection apparatus.
Figure 5:
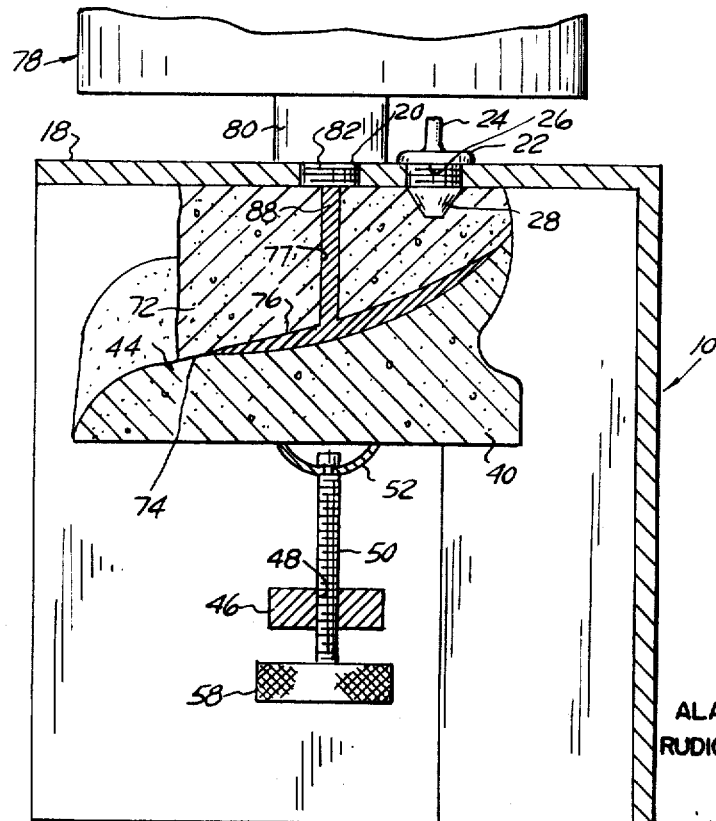
FIG. 5 is a view similar to FIG. 2 but showing the prosthesis material filling the mold cavity subsequently to injection.

An example of a flask for practicing the present invention for making a molded prosthesis such as a denture, a partial, an orthondic article, or the like, consists of a box-like enclosure 10 shown at FIGS. 1–5. The box-like enclosure or flask 10 may have any convenient shape and it may be square, rectangular, or, as shown, it may be substantially U-shaped in section and provided with an integral support base 12. The flask 10 is made of any convenient material, preferably a metal or metal alloy such as aluminum, bronze, steel or the like. The flask 10 has a pair of opposite side walls 14 and 16, and an end wall 18. The top of the flask 10, i.e. the end opposite to the base 12, is open and the end of the flask opposite to the end wall 18 is also open. The end wall 18, as best shown in FIGS. 2, 4 and 5 has a plurality of threaded apertures 20 disposed therethrough which can be obturated by means of threaded slugs 22, each having an end projecting to the outside of the end wall which, as shown at 24, is shaped as a flat portion so as to provide a convenient finger grip for threading the slugs in any appropriate aperture 20 in the end wall or for removal therefrom. Each slug 22 has an enlarged diameter portion forming an annular abutment 26, best shown in FIGS. 2 and 5, adapted to engage the exterior surface of the end wall 18 when the slug is threaded in an aperture 20 such that a projecting end portion, preferably tapered as shown at 28, protrudes into the interior of the flask from the inner surface of the end wall 18.

Proximate the end wall 18, there is normally disposed a removable block 30 of resilient material, FIGS. 1–3, made preferably of a foam rubber or rubber-like material, and having an exterior contour substantially shaped as the cross section of the flask interior and a generally U-shaped inner cut out portion as shown at 32. The block 30 of resilient material is held in a partial frame 34 made of a flat strip of spring material such as stainless steel or the like, to the inner surface of which the block of resilient material is preferably bonded. The partial frame 34 is provided with a pair of bent over projecting portions 36 and 38 for permitting at will the removal of the frame 34 and of the block 30 of resilient material held therein. The U-shaped cut out portion 32 in the block 30 of resilient material is adapted to compressibly accept and grip a half mold made of a cast plaster or stone model 40 of, for example, a portion of a buccal cavity representing on its surface a model of the tissue bearing surfaces for a prosthesis.

Prior to placing the plaster or stone model 40 in the flask 10 a wax pattern, as shown at 42 in FIG. 2, is placed on adhesion to the surface 44 of the model 40 forming a representation of the prosthesis tissue bearing surfaces. The wax pattern is made of a piece of wax sheet for example about 0.025 in. in thickness, which is cut to appropriate dimensions and which is manually formed, applied to the surface 44 of the cast model 40, polished and shaped by finger action and trimmed to the appropriate outer contour shape and dimensions required in the final prosthesis article. The half mold defining model 40 is securely held in position in the flask as a result of being slightly larger than the cut-out portion 32 of the block 30 of resilient material such that the edges of the model engage the inner surface of the cut out portion, as shown at FIG. 3, thus compressing the resilient material forming the block 30 to insure good frictional and pressure grip of the model. The flask 10 also includes a cross member 46 transversely disposed between the two side walls 14 and 16 and fastened thereto by any convenient means such as soldering, brazing or by means of screws, not shown. The cross member 46 has a substantially centrally disposed threaded bore 48 adapted to accept a threaded rod 50 provided with appropriate means on one end thereof for engaging the back of the model 40. In the example of the invention illustrated, and as best shown at FIG. 2, such means consists of a cup-like metallic or plastic clamping member 52 mounted for free rotation on the end of the threaded rod 50 by means of an axially disposed hole 54, the edge whereof engages a groove 56 formed proximate the end of the rod. The other end of the threaded rod 50 projecting beyond the cross member 46 has a knob 58, such that the threaded rod 50 and the clamping cup-like member 52 on the end thereof may be manually advanced until the edge of the cup-like member 52 engages the back of the model 40.

The cast model 40 is thus held in position in the flask 10 by its edge gripped within the U-shaped cut-out portion 32 of the block 30 of resilient material and, additionally if so desired, the threaded rod 50 may be advanced such that the clamping cup-like member 52 on the end thereof engages the back of the model 40. The threaded apertures 20 are normally closed by means of the slugs 22 threaded in position. A gate forming plug, generally designated at 60 in FIG. 2, is threaded in the remaining threaded aperture 20. The gate forming plug 60 consists of a rod 62 slidably disposed through a longitudinal bore 64 in a support member 66 which has a reduced diameter threaded portion 68 for engagement in the threaded aperture 20 in the end wall 18. The rod 62 is slidably adjusted such that its end 70 projecting into the interior of the flask abuts against the surface of the wax pattern 42.

An investment material, such as plaster or stone, is then poured through the top of the flask in the space between the half mold cast model 40 and the interior surface of the end wall 18. The interior surface of the U-shaped cut out portion 32 of the block 30 of resilient material forms a dam for the fluid investment material such that it is contained between the surface 44 of the half mold cast model 40, the surface of the cut out portion 32 of the block 30 of resilient material and the inner surface of the end wall 18. When set, the investment material forms a second half mold, as shown at 72. Preferably, before casting of the investment material forming the half mold 72, all the showing surfaces of the stone or plaster half mold model 40 in contact with the investment material are coated with a "separating medium", such as, for example, Coe Set tin foil material substitute, made by Coe Laboratories, Inc., or any equivalent material well known in the art, to permit easy separation between the two half molds. After the investment material has hardened, the gate forming plug 60 including the rod 62 is removed, thus leaving a passageway or gate 77 through the half mold 72 between the mold cavity 76 and the end wall threaded aperture 22, and the two half molds 40 and 72 are either removed from the flask or separated. The wax pattern 42 is removed and the two half molds are soaked in water for about 30 minutes. If the second half mold 72 is also removed from the flask for the soaking operation, it is obvious that the projecting portions 28 of the slugs 22 leave corresponding cavities in the surface of the half mold 72 engaging the inner surface of the flask end wall 18, thus defining appropriate registration means that ensures that the half mold 72 may be returned to the flask in a proper position corresponding exactly to its original position.

After soaking in water, the two half molds are again coated with a separating medium. The soaking in water and the coating with the separating medium renders the mold plaster or stone substantially non-porous such that the final molded article is provided with a good surface finish and, when the article is molded of acrylic plastic or the like, bubbling and discoloration of the plastic is prevented.

The block 30 of resilient material is removed from the flask, and the two half molds are returned to the flask, the second half mold 72 being properly positioned by means of the projecting portions 28 of the slugs 22 engaging the corresponding cavities in the mold face, and the first half mold model 40 being simply aligned and held in position as a result of the engagement of its surface 44 with the corresponding surface 74 of the second half mold 72, the clamping rod 50 being advanced in such manner that the clamping cup-like member 54 engages the back of the half mold model 40. Registration between the two surfaces 44 and 74 of the half mold are naturally accomplished, but if so desired, additional alignment means may be provided between the two half molds, such as provided by rods imbedded in the half mold model 40 and projecting from portions of the surface 44 thereof in such a manner that when the investment material was cast so as to form the second half mold 72, corresponding recesses were formed in the second half mold to insure registration upon returning of the two half molds to the flask. The two half molds 40 and 72 are placed in the flask and clamped in position as shown in FIG. 5, and the abutting surfaces 44 and 74 of the two half molds defined therebetween a mold cavity 76. An appropriate material, for example, molten metal, pasty porcelain or a polymerizable resin such as, for example, polymerizable acrylic resin in a fluid state, is injected in the mold cavity 76 by means of a pressure injecting apparatus, generally designated at 78 in FIG. 4 and 5. The pressure injection apparatus may be any convenient apparatus provided with a nozzle 80 having a threaded fitting 82 which can be screwed into the threaded aperture 20 in the rear wall 18 of the flask, after removal therefrom of the gate forming plug 60. The example of pressure injection apparatus 78 shown at FIG. 4 comprises simply a cylinder 84 having a piston 86 reciprocable therein and removable from the cylinder. The cylinder 84 is partly filled with, for example, a polymerizable acrylic resin, and manual pressure applied on the top of the piston 86 is sufficient to inject the acrylic resin through the gate 77 in the half mold 72 into the mold cavity 76. The air contained in the mold cavity 76 normally escapes through the interface between the abutting surfaces 44 and 74 of the two half molds, and the mold cavity 76 is fully filled with the acrylic resin, or other material. If so desired shallow scratches may be formed on the surfaces 44 or 74 of one of the half molds before returning the half molds to the flask prior to injection of the material into the mold cavity 76 so as to aid the escape of the air from the mold cavity to the ambient.

After the appropriate material, such as for example polymerizable acrylic resin, has been injected into the mold cavity 76, and is set, the flask is open, the two half molds 40 and 72 are removed from the flask and separated, and the prosthesis is removed from the mold cavity. All that is required is cutting off of the sprue 88 of solidified material present in the gate 77, and a minimum amount of finishing work corresponding to the root of the sprue is generally all that is required in view of the perfect dimension and perfect surface finish of the molded prosthesis.

When polymerizable acrylic resin is used for forming the prosthesis in the mold cavity, the acrylic resin is cured in position in the mold cavity in the flask according to whatever procedure is recommended by the acrylic resin supplier. For curing fast cure, or cold cure, polymerizable acrylic resin, the flask is submerged in an appropriate enclosure filled with lukewarm water, and the enclosure is connected to an air pressure supply at about 30 psi. Cold cure generally requires that the flask be maintained in the enclosure for a period of 10–15 minutes. When heat curable polymerizable acrylic resin is used for forming the prosthesis, the flask is placed in a container filled with boiling water for about an hour for curing.

As compared to conventional methods using conventional apparatus for obtaining prosthesis such as dentures, partials, orthondic appliances and the like, the method and apparatus of the present invention permit not only to use unskilled or semi-skilled labor, as previously mentioned, but permit to provide a finished appliance in half the time usually required by conventional means.

Having thus described the invention with reference to a preferred embodiment thereof, modification whereof will be apparent to those skilled in the art, what is claimed as new and sought to be protected by United States Letters Patent is as follows:

We claim:

1. An apparatus for making a molded article comprising a flask having a bottom, two sidewalls, an end wall and an open top, means in said flask for holding a first half mold with a wax pattern of the article on a surface thereof and for forming a dam for investment material poured between said first half mold and said end wall for forming a second half mold, said means for holding said first half mold comprising a block of resilient material substantially U-shaped and removably disposed in said flask proximate said end wall for compressably holding said first half mold by engaging at least two opposite sides thereof, registration means dependent from said end wall for providing registration of said investment material forming said second half mold when set with said end wall and a gate forming plug extending to the exterior of said flask with an end of said plug engaged with the wax pattern.

2. The apparatus of claim 1 wherein said registration means comprises threaded apertures through said end wall and a plurality of slugs each threadably engaged in one of said threaded apertures in said end wall and having a portion projecting from said end wall into said flask.

3. The apparatus of claim 2 wherein said gate forming plug comprises a support member threadably engageable in one of said threaded apertures and having a longitudinally disposed bore, and a rod slidably disposed through said bore and adjustable for engagement of an end thereof with said wax pattern.

4. The apparatus of claim 3 further comprising adjustable clamping means engageable with said first half mold for clamping said first half mold with said second half mold.

5. The apparatus of claim 3 further comprising injection molding apparatus having a nozzle threadable in said aperture in the end wall after removal of said gate forming plug.

* * * * *